(12) United States Patent
Dudar

(10) Patent No.: US 10,337,426 B2
(45) Date of Patent: Jul. 2, 2019

(54) METHODS AND SYSTEMS FOR REDUCING WATER ACCUMULATION IN AN ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/673,329

(22) Filed: Aug. 9, 2017

(65) Prior Publication Data

US 2019/0048813 A1 Feb. 14, 2019

(51) Int. Cl.

| | |
|---|---|
| *F02D 41/00* | (2006.01) |
| *B60W 10/06* | (2006.01) |
| *B60W 20/50* | (2016.01) |
| *F02D 13/06* | (2006.01) |
| *F02D 41/06* | (2006.01) |
| *F02D 41/26* | (2006.01) |
| *F02M 35/10* | (2006.01) |
| *F02D 41/04* | (2006.01) |
| *F02M 35/104* | (2006.01) |

(52) U.S. Cl.
CPC ......... *F02D 41/0055* (2013.01); *B60W 10/06* (2013.01); *B60W 20/50* (2013.01); *F02D 13/06* (2013.01); *F02D 41/0087* (2013.01); *F02D 41/065* (2013.01); *F02D 41/26* (2013.01); *F02M 35/10393* (2013.01); *B60W 2510/068* (2013.01); *B60W 2510/244* (2013.01); *B60W 2550/12* (2013.01); *B60W 2710/0644* (2013.01); *F02D 41/042* (2013.01); *F02D 2200/70* (2013.01); *F02M 35/104* (2013.01)

(58) Field of Classification Search
CPC .. F02D 41/0055; F02D 41/26; F02D 41/0087; F02D 41/065; F02D 13/06; F02D 2200/70; F02D 41/042; B60W 10/06; B60W 20/50; B60W 2510/068; B60W 2550/12; B60W 2710/0644; B60W 2510/244; F02M 35/10393; F02M 35/104
USPC .......................................................... 701/22
See application file for complete search history.

(56) References Cited

U.S. PATENT DOCUMENTS

| | | | | |
|---|---|---|---|---|
| 2002/0096134 A1* | 7/2002 | Michelini | ............... | F02D 37/02 123/90.15 |
| 2006/0128513 A1* | 6/2006 | Tata | ....................... | B60K 6/365 475/5 |

(Continued)

*Primary Examiner* — Muhammad Shafi
(74) *Attorney, Agent, or Firm* — Julia Voutyras; McCoy Russell LLP

(57) ABSTRACT

Methods and systems are provided for reducing accumulation of condensate in an engine intake during an engine non-combusting condition. In one example, during an engine non-combusting condition, responsive to a higher than threshold ambient humidity and a lower than threshold intake manifold temperature, intake and exhaust valves of deactivatable cylinders may be closed in order to seal the cylinders and during an immediately subsequent engine combusting condition, the intake and exhaust valves of the deactivatable cylinders may be activated and combustion may be resumed in the deactivatable cylinders before starting combustion in non-deactivatable cylinders. Also, during the engine non-combusting condition, residual hot exhaust may be recirculated to the intake manifold to evaporate condensate in the intake manifold.

20 Claims, 5 Drawing Sheets

(56) References Cited

U.S. PATENT DOCUMENTS

| | | | |
|---|---|---|---|
| 2007/0240659 A1* | 10/2007 | Rozario | F01L 1/146 123/90.59 |
| 2008/0072869 A1* | 3/2008 | Maehara | F01L 1/022 123/198 F |
| 2008/0287253 A1* | 11/2008 | Gibson | B60W 30/20 477/53 |
| 2010/0180857 A1* | 7/2010 | Yokoyama | F01L 1/053 123/198 F |
| 2010/0280739 A1* | 11/2010 | Rollinger | F01L 1/34 701/102 |
| 2014/0102428 A1 | 4/2014 | Fulton et al. | |
| 2015/0075458 A1* | 3/2015 | Parsels | F02D 13/06 123/90.12 |
| 2016/0169170 A1 | 6/2016 | Russ et al. | |

* cited by examiner

METHODS AND SYSTEMS FOR REDUCING WATER ACCUMULATION IN AN ENGINE

FIELD

The present description relates generally to methods and systems for reducing water accumulation in an engine intake.

BACKGROUND/SUMMARY

Condensate accumulated in an engine intake may get ingested in the engine while the engine is combusting, thereby causing misfires. For example, moisture from humid air may condense on engine components such as the intake manifold and a charge air cooler and form a water puddle locally. Condensate accumulated in the intake manifold or in the charge air cooler (CAC) coupled to the intake manifold may enter the engine cylinders during engine operation, and cause combustion instability.

Various approaches are provided for reducing occurrence of engine misfires due to ingestion of condensate. In one example approach, as shown in US 20160169170, Russ et al. disclose a method to increase airflow through a charge air cooler (CAC) in order to purge condensate from the CAC. A number of engine cylinders of a variable displacement engine (VDE) are selectively deactivated in order to transiently increase air flow via the CAC. During cylinder deactivation, fueling may be disabled to the one or more deactivated engine cylinders while the intake and exhaust valves remain operational, thereby increasing airflow through the CAC. By adjusting the number of cylinders that are deactivated based on an airflow increase required to purge the condensate stored in the CAC, condensate ingestion is reduced.

However, the inventors herein have recognized potential disadvantages with the above approach. As one example, the approach may not be able to address condensation accumulated at one or more engine components during conditions when an engine is not running. The inventors have recognized that during selected conditions, such as during hybrid vehicle propulsion using motor torque from a system battery, during an engine deceleration fuel shut-off condition, or during an engine idle-stop conditions, moisture may accumulate in an engine. In particular, during such engine non-combusting conditions, the engine intake air temperature may fall below a dew point temperature. If the vehicle is travelling through a region having elevated ambient humidity when the intake air temperature falls below the dew point temperature, humid air may enter the intake manifold, such as past a substantially closed intake throttle, and cylinder valves, even if the engine is not running. Since cylinder valves may remain open during a non-combusting condition based on the position of the associated cam lobes at the time when the engine was stopped, the humid air entering the engine may condense in the intake manifold. The moisture may even enter and condense within the cylinders. When the engine is restarted and fuel is subsequently combusted in the engine cylinders, the condensate collected in the intake manifold may be ingested in the cylinders, causing engine misfires and combustion instability.

The inventors herein have recognized that the valve mechanisms of selectively deactivatable cylinders can be controlled so as to hold them in a closed position when desired. By holding them actively closed during conditions when the engine is not combusting and the vehicle is travelling through conditions where condensation in the intake manifold from ambient air is likely, ingestion of moisture in at least those deactivatable cylinders can be reduced. Thus in one example, the issues described above may be addressed by an engine method comprising: responsive to a higher than threshold ambient humidity during an engine non-combusting condition, holding deactivatable cylinder valves closed, and during an immediately subsequent engine combusting condition, activating the deactivatable cylinder valves, and starting combustion in deactivatable cylinders before starting combustion in non-deactivatable cylinders. In this way, when ambient humidity is high while a vehicle is operated with the engine not combusting fuel, valves coupled to deactivatable cylinders may be intentionally held closed to reduce moisture ingestion into the cylinders.

As one example, during engine non-combusting conditions such as vehicle propulsion using motor torque, a deceleration fuel shut-off condition, and an engine idle-stop condition, the engine intake manifold temperature may drop to below a threshold temperature, such as a dew point temperature. If the vehicle is concurrently travelling through regions with higher than threshold ambient humidity, as estimated based on inputs from engine system sensors and/or from an external network communicatively coupled to the vehicle, air saturated with moisture may enter and condense in the intake manifold. To reduce ingestion of this moisture from the intake manifold into the engine cylinders, when the engine is not-combusting fuel, the engine may be rotated using motor torque to engage the valve actuation mechanism of the engine's selectively deactivatable cylinders. The amount of motor torque applied is adjusted so that the valves may be held closed thereby sealing the respective cylinders. Since the engine exhaust manifold may continue to retain heat during engine non-combusting conditions, in response to a higher than threshold exhaust temperature, unburnt fuel and hot exhaust gas may also be routed from the exhaust manifold to the intake manifold via an exhaust gas recirculation (EGR) passage to further reduce intake manifold condensation. The valves may be held closed while the engine is not combusting until an engine restart condition is met. During an immediately subsequent engine combustion event of the restart, the deactivatable cylinders may be reactivated by actuating the corresponding valve mechanisms and combustion may be resumed in the deactivatable cylinders first, while the non-deactivatable cylinders are maintained in the non-combusting condition. After a threshold number of engine cycles have elapsed after resuming combustion in the deactivatable cylinders, combustion may be resumed in the non-deactivatable cylinders while maintaining combustion in the deactivatable cylinders.

In this way, by selectively closing the valves of deactivatable engine cylinders during an engine non-combusting condition, responsive to a higher than threshold ambient humidity, moisture ingestion into the deactivated cylinders and in-cylinder moisture accumulation may be reduced. As a result, misfire occurrence in those cylinders during a subsequent engine operation is also reduced. By recirculating hot residual exhaust through the intake manifold concurrently, moisture condensation in the intake manifold may also be reduced. The technical effect of reactivating the deactivatable cylinders and resuming combustion initially in the deactivatable cylinders (before resuming combustion in non-deactivatable cylinders) during an immediately subsequent engine restart is that the intake manifold temperature may be increased the accumulated moisture may be evaporated. By allowing at least some of the accumulated moisture to be evaporated before initiating combustion in the non-deactivatable cylinders (whose valves cannot be actively held closed), the ingestion of condensate into the non-deactivatable cylinders during cylinder combustion is reduced, thereby increasing combustion stability and misfire occurrence in the non-deactivatable cylinders. By recirculating hot exhaust residuals to the intake manifold during the higher than threshold ambient humidity condition while the engine is not combusting, residual exhaust heat may be effectively used to increase the engine intake temperature, thereby reducing the possibility of intake manifold water puddle formation. Overall, by reducing water accumulation in the intake manifold and within engine cylinders during engine non-combusting conditions, combustion stability may be increased and propensity of misfire may be decreased during an immediately subsequent engine combusting condition.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
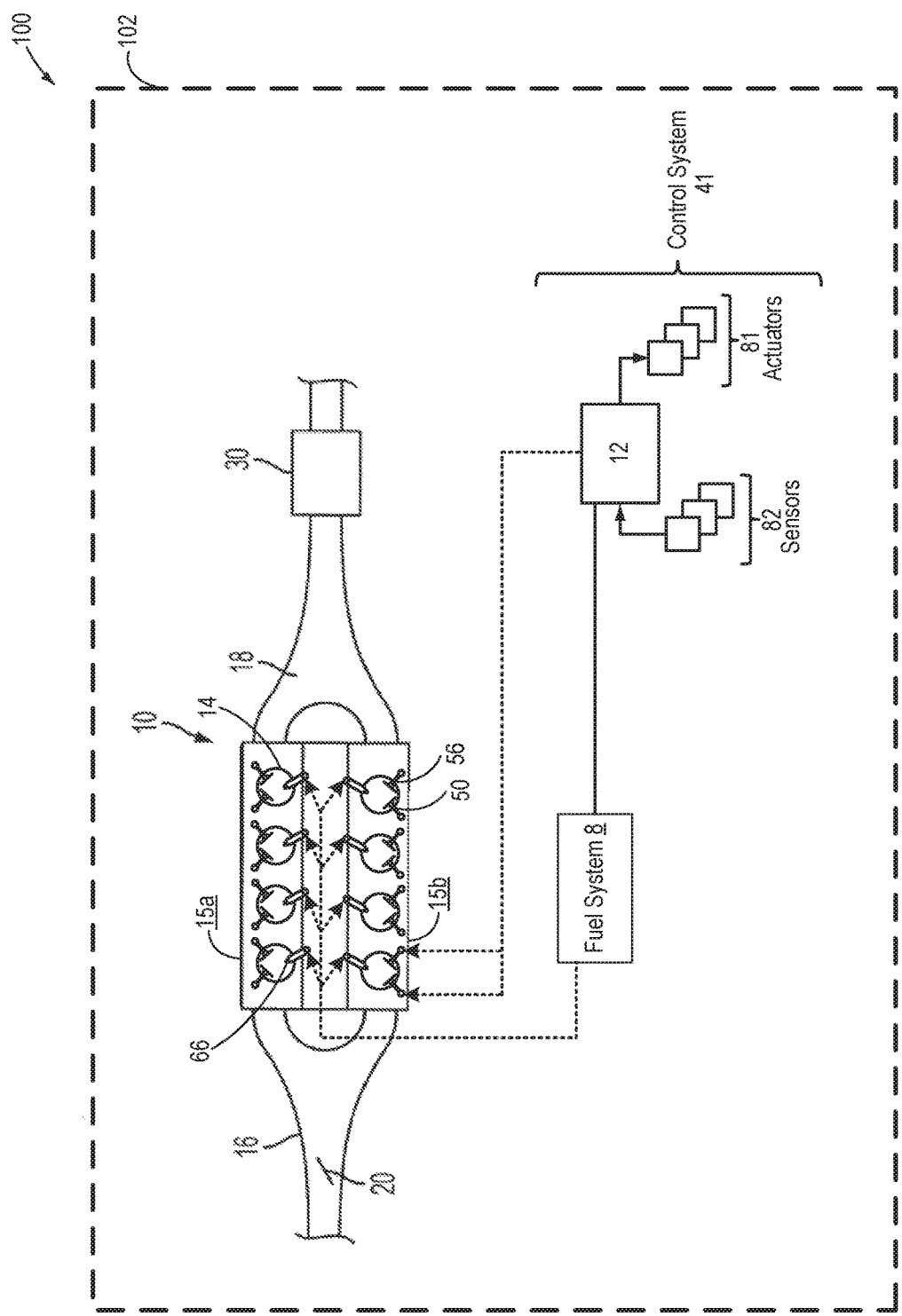
FIG. 1 shows an example embodiment of an engine configured with an individual cylinder deactivation mechanism.
Figure 2:
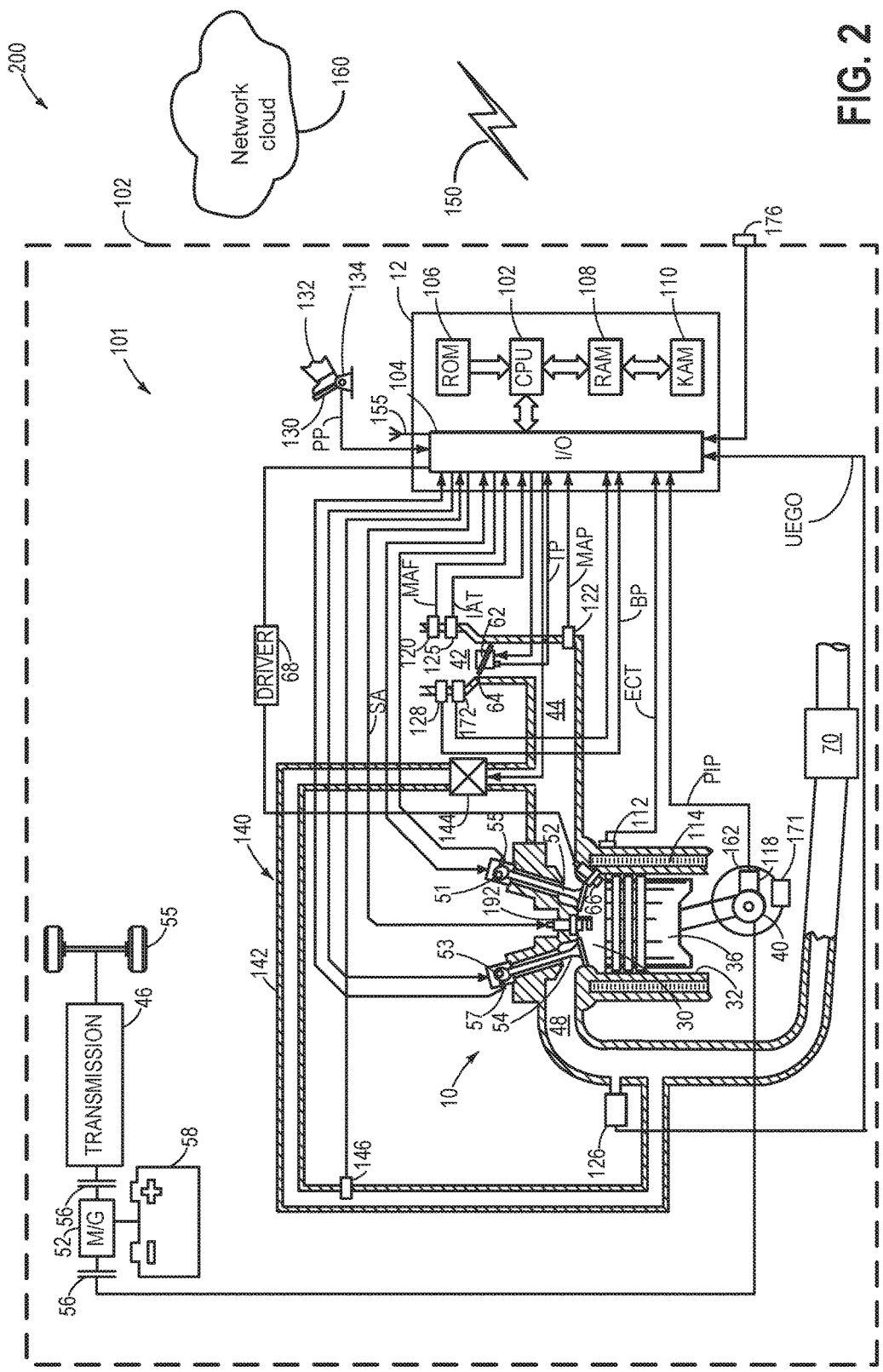
FIG. 2 shows an example variable displacement engine (VDE) system coupled to a hybrid vehicle.

The following description relates to systems and methods for reduction in water ingestion into engine cylinders during higher than threshold ambient humidity conditions while an engine is in a non-combusting condition. As described with reference to example engine systems coupled to a hybrid vehicle system, as shown in FIGS. 1-2, selective cylinder deactivation in a VDE allows for the selective sealing one or more engine cylinders. An engine controller may be configured to perform a control routine, such as the example routine of FIG. 3, to reduce cylinder ingestion of water that has accumulated in an engine intake during engine non-combusting conditions by holding the valves of selectively deactivatable cylinders closed. The controller may also adjust an engine shut-down position during a higher than threshold ambient humidity condition, such as via the control routine of FIG. 4, to shut down the engine is a position where valves of at least a selectively deactivatable cylinder is closed. An example of engine adjustments that enable the reduction of engine intake water accumulation and in-cylinder water ingestion is shown in FIG. 5.

FIG. 1 shows an example embodiment 100 of an engine 10 coupled to a vehicle system 102. Engine 10 may have a first bank 15a and a second bank 15b. In the depicted example, engine 10 is a V8 engine with the first and second banks each having four cylinders. Engine 10 has an intake manifold 16, throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine 10 may have cylinders 14 with selectively deactivatable intake valves 50 and selectively deactivatable exhaust valves 56. In one example, intake valves 50 and exhaust valves 56 are configured for camshaft actuation (as elaborated in FIG. 2) via individual camshaft-based cylinder valve actuators. Each engine cylinder bank could include one camshaft that actuates the intake and exhaust valves. In an alternate example, each engine cylinder bank could include one camshaft actuating intake valve and a separate camshaft actuating exhaust valve. In alternate examples, the valves may be configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves. The engine components actuated during cylinder valve activation/deactivation may be collectively known as VDE mechanisms or VDE actuators.

During selected conditions, such as when the full torque capability of the engine is not desired (such as when engine load is less than a threshold load, or when operator torque demand is less than a threshold demand), one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. The cam based cylinder valve actuators may be controlled via engine torque. When the engine is not combusting, the position of the engine may be adjusted using motor torque from a starter motor. During the engine non-combusting condition, the position of the engine may be adjusted to a desired engine shut-down position at which the cams are engaged and the cylinder valves may be actuated to a desired valve position. Herein, the cylinder deactivating mechanisms may be collectively referred to as VDE mechanisms. In some examples, fuel flow to the deactivated cylinders may be stopped, such as by deactivating cylinder fuel injectors 66. In some examples, spark supplied to the deactivated cylinders may also be stopped, such as by disabling a current to a spark circuit.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from the enabled cylinders) exposed to combustion reduces engine heat losses, improving the thermal efficiency of the engine.

As elaborated herein, the deactivatable cylinder valves may be effectively used to reduce water accumulation inside the deactivatable cylinders during engine-off conditions, thereby reducing the propensity of misfire occurrence during an immediately subsequent engine operating condition. As detailed with reference to FIG. 3, during an engine non-combusting condition, the intake manifold temperature and the engine temperature (indicative of engine cylinder wall temperature) may decrease to below a dew point temperature and if the ambient humidity increases to above a threshold humidity, moisture from ambient air may condense on the cooler surface of the intake manifold. Since the engine valves may remain open during the non-combusting condition, the moisture may even enter and condense within the cylinders. During a subsequent engine combusting condition, the condensate collected in the intake manifold may be ingested in the cylinders, causing engine misfires and combustion instability.

In this way, in response to a higher than threshold ambient humidity, during an engine-off condition, each intake valve and exhaust valve coupled to one or more deactivatable engine cylinders may be closed in order to seal the deactivatable cylinders, thereby reducing the possibility of water condensation within these cylinders. During an immediately subsequent engine restart, each intake valve and exhaust valve coupled to the one or more deactivatable engine cylinders may be reactivated and fueling to the one or more deactivatable cylinders may be resumed before resuming fueling to non-deactivatable cylinders of the engine.

By resuming combustion initially in the previously sealed deactivatable cylinders on the engine restart, misfire occurrence and combustion instability can be reduced since these are the cylinders where water ingestion was actively reduced during the preceding engine shut-down (or idle-stop). After carrying out combustion in the deactivatable cylinders for a number of engine cycles, the engine temperature and the intake manifold temperature may be raised. Due to the increased engine temperature and intake temperature, any remaining condensate in the intake manifold may be evaporated. By resuming combustion in the non-deactivatable cylinders after the intake manifold temperature has increased to above a threshold temperature, non-deactivatable cylinder operation may be delayed until it can be better ensured that the remaining condensate has evaporated, thereby increasing combustion stability.

Engine 10 may operate on a plurality of substances, which may be delivered via fuel system 8. Fuel tanks in fuel system 8 may hold fuel with different fuel qualities, such as different fuel compositions. These differences may include different alcohol content, different octane, different heat of vaporizations, different fuel blends, and/or combinations thereof etc. Engine 10 may be controlled at least partially by a control system 41 including controller 12. Controller 12 may receive various signals from sensors 82 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors.

FIG. 2 is a schematic diagram 200 showing a vehicle system 102 comprising an engine system 101. The vehicle system may be a hybrid vehicle system further comprising an electric motor for operating the vehicle. FIG. 2 shows one cylinder of a multi-cylinder engine 10 in the engine system 101. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor 171 may be coupled to crankshaft 40 via flywheel 162 to enable cranking (e.g., spinning) of engine 10, typically used for starting the engine. When starting an engine, after combustion occurs, actuation of the starter is ceased as combustion facilitates spinning of the engine. In one example, starter motor 171 may be a conventional starter motor. In other examples, starter motor 171 may be an integrated starter motor, such as those typically found on hybrid vehicles.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. Cam actuation systems 51 and 53 comprise a variable displacement engine (VDE) mechanism and may be used to selectively deactivate (close) one or more of the intake valve 52 and the exhaust valve 54 during cylinder deactivation. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the combustion chamber 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. One or more engine cylinders may be selectively deactivated by closing the individual intake valve mechanisms, the exhaust valve mechanisms, or a combination of both via the cylinder deactivating mechanisms (referred herein as VDE mechanisms).

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

In some embodiments, each cylinder of engine 10 may include a spark plug 192 for initiating combustion. Ignition system can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines. In one example, during selective deactivation of one or more engine cylinders (via VDE mechanism), spark supplied to the deactivated cylinders may also be stopped, such as by disabling operation of the spark plug 192.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 125, the barometric pressure (BP) sensor 128, and the ambient humidity sensor 172. The IAT sensor 125 estimates intake air temperature to be used in engine operations and provides a signal to the controller 12. The BP sensor 128 estimates the ambient pressure for engine operations and provides a signal to the controller 12. Similarly, the ambient humidity sensor 172 estimates the ambient humidity for engine operations and provides a signal to the controller 12. The intake passage 42 may further include a mass air flow sensor 120 and a manifold air pressure sensor 122 for providing respective signals MAF and MAP to the controller 12. A rain sensor 176 may be coupled to a windshield of the vehicle 102 to detect increased humidity and rainy conditions.

An exhaust gas sensor 126 is shown coupled to the exhaust passage 48 upstream of an emission control device 70. The sensor 126 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor. Input from the exhaust gas sensor 126 may also be used to estimate ambient humidity.

The emission control device 70 is shown arranged along the exhaust passage 48 downstream of the exhaust gas sensor 126. The device 70 may be a three way catalyst (TWC), a NOx trap, a particulate filter, various other emission control devices, or combinations thereof. In some embodiments, during operation of the engine 10, the emission control device 70 may be periodically reset by operating at least one cylinder of the engine within a particular air/fuel ratio.

An exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. In one example, sensor 146 may be a DPFE (Differential Pressure Feedback EGR) sensor. The amount of EGR recirculated from the exhaust to the intake manifold (or the EGR flowrate) may be estimated based on input from the DPFE sensor. The DPSE sensor may monitor a pressure difference across a flow control orifice in the EGR passage to measure the EGR flowrate. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

As such, hot EGR may be effectively used to evaporate condensate accumulated in the engine intake manifold. During engine-off conditions, some residual exhaust gas may remain in the exhaust manifold. In response to lower than threshold engine intake temperatures and higher than threshold ambient humidity, an opening of the EGR valve may be adjusted to recirculate the hot exhaust residuals to the intake manifold. The hot exhaust residuals may evaporate at least a part of the condensate accumulated in the intake manifold, thereby further reducing ingestion of water from the intake manifold into the cylinders. In addition, further condensation of moisture in the intake manifold is reduced. Adjusting the opening of the EGR valve includes, in response to a higher than threshold temperature of the residual exhaust gas, increasing the opening as each of an intake manifold temperature decreases and the ambient humidity increases, and decreasing the opening as each of the intake manifold temperature increases and the ambient humidity decreases. In response to a lower than threshold temperature of the residual exhaust gas, the EGR valve may be closed.

The controller 12 is shown in FIG. 2 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust AFR from oxygen sensor 126, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; absolute manifold pressure signal, MAP, from the sensor 122; ambient humidity signal, from sensor 172; and intake air temperature, from IAT sensor 125. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft. In addition, sensors coupled to the exterior of the vehicle system such as the rain sensor 176 may be used to estimate ambient humidity. The controller 12 may be coupled to a wireless communication device 155 for direct communication of the vehicle 102 with a network cloud 160. Using the wireless communication 150 via the device 155, the vehicle 102 may retrieve data regarding current and/or upcoming ambient conditions (such as ambient humidity, temperature, pressure etc.) from the network cloud 160.

The storage medium read-only memory 106 can be programmed with computer readable data representing non-transitory instructions executable by the processor 102 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug, etc.

The controller 12 receives signals from the various sensors of FIG. 2 and employs the various actuators of FIG. 2 to adjust engine operation based on the received signals and instructions stored on a memory of the controller 12. In one example, in response to a higher than threshold ambient humidity condition as estimated via the inputs from the humidity sensor 172, during an engine-off condition, the controller 12 may send a signal to the cam actuation systems 51 and 53 to selectively close the intake valve 52 and the exhaust valve 54 of a deactivatable cylinder. In another example, in response to a higher than threshold ambient humidity condition, during an engine-off condition, the controller 12 may send a signal to the EGR valve 144 to actuate the valve to an open position to recirculate hot residual exhaust gas from the exhaust manifold to the intake manifold.

In some examples, vehicle 102 may be a hybrid vehicle with multiple sources of torque available to one or more vehicle wheels 55. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft 40 of engine 10 and electric machine 52 are connected via a transmission 46 to vehicle wheels 55 when one or more clutches 56 are engaged. In the depicted example, a first clutch 56 is provided between crankshaft 40 and electric machine 52, and a second clutch 56 is provided between electric machine 52 and transmission 46. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 46 and the components connected thereto. Transmission 46 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge traction battery 58, for example during a braking operation.

In this way, the systems of FIGS. 1-2 enable a system for a hybrid vehicle comprising: an electric machine including a battery, an engine with a deactivatable cylinder and a non-deactivatable cylinder, each of an intake valve and an exhaust valve coupled to the deactivatable cylinder, each of the intake valve and exhaust valve selectively actuatable via a variable displacement engine (VDE) actuator, each of another intake valve and another exhaust valve coupled to the non-deactivatable cylinder, one or more fuel injectors coupled to each of the deactivatable cylinder and the non-deactivatable cylinder, an ambient humidity sensor and an intake air temperature sensor coupled to an engine intake manifold, an exhaust temperature sensor coupled to an exhaust manifold, a rain sensor coupled to a vehicle windshield wiper, an exhaust gas recirculation (EGR) passage coupling the engine exhaust manifold to the engine intake manifold, the EGR passage including an EGR valve. The vehicle engine may further comprise a controller with computer readable instructions stored on non-transitory memory for estimating ambient humidity via one or more of the ambient humidity sensor and the rain sensor, responsive to a first engine-off condition, actuating the VDE actuator to selectively close the intake valve and the exhaust valve of the deactivatable cylinder while maintaining the another intake valve and another exhaust valve of the non-deactivatable cylinder open before disabling fuel to the engine, and responsive to a second engine-off condition, maintaining each of the intake valve and the exhaust valve of the deactivatable cylinder and the another intake valve and another exhaust valve of the non-deactivatable cylinder open before disabling fuel to the engine.

Figure 3:
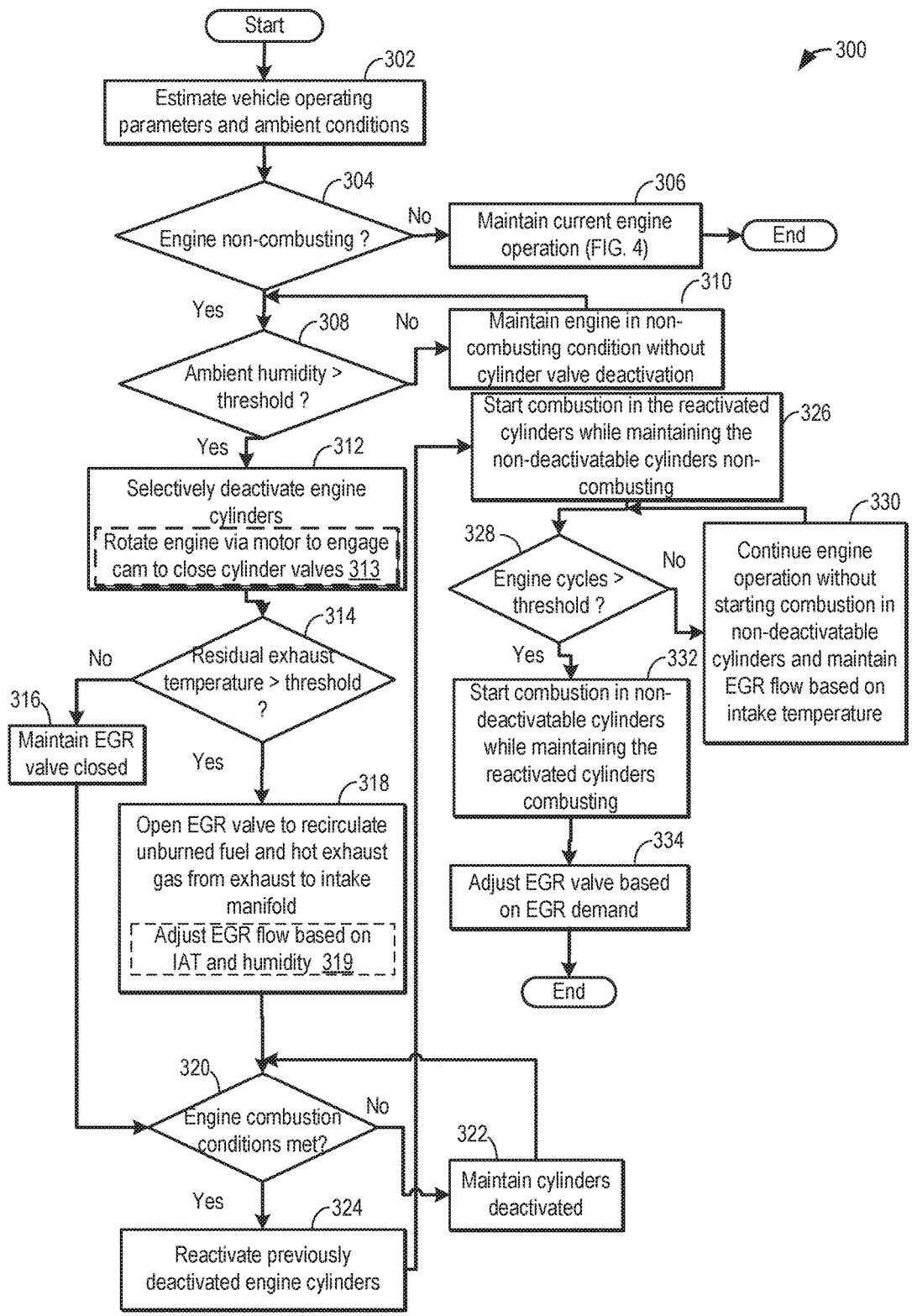
FIG. 3 shows a flow chart illustrating an example method that can be implemented to reduce water accumulation in an engine intake during an engine non-combusting condition.

FIG. 3 shows an example method 300 for reducing water accumulation in an engine intake manifold and engine cylinders during an engine non-combusting condition. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, exhaust temperature, manifold pressure, manifold air flow, battery state of charge, etc. In addition ambient conditions such as ambient humidity, temperature, and barometric pressure may be estimated. In one example, ambient humidity may be measured via one or more of an intake humidity sensor (such as humidity sensor 172 in FIG. 2) and a windshield humidity sensor (such as rain sensor 176 in FIG. 2). Ambient humidity conditions at a current vehicle location may be obtained from weather data, as retrieved from an external network (such as network cloud 160 in FIG. 2) communicatively coupled to the vehicle via wireless communication (such as wireless communication 150 in FIG. 2).

At 304, the routine includes determining if the engine is in a non-combusting condition. An engine non-combusting condition may include an engine idle-stop condition, a deceleration fuel shut-off (DFSO) condition, and an engine shut-down event. For example, engine combustion may be suspended when one or more idle-stop conditions are met. As an example, engine idle-stop conditions may include, engine idling for a longer than threshold duration (such as at a traffic stop), a greater then threshold (such as at least more that 30% charged) state of charge (SOC) of the battery coupled to the electric machine, the air conditioner not issuing a request for restarting the engine (as may be requested if air conditioning is desired). Also, if the vehicle speed is lower than a threshold (e.g., 3 mph) an engine idle-stop may be requested even if the vehicle is not at rest. Further, prior to an engine idle-stop, an emission control device coupled to the exhaust manifold of engine may be analyzed to determine that no request for engine restart was made.

As another example, during a DFSO condition, fuel injection to the engine cylinders may be suspended and the engine may be rotated un-fueled. In one example, the DFSO condition may be in response to an accelerator pedal tip-out (that is, where the operator has released an accelerator pedal and requested a decrease in torque), where the vehicle may be coasting.

As yet another example, the engine may be non-combusting and held shut-down when the vehicle is propelled using motor torque from an electric machine (such as electric machine 52 in FIG. 2) of the hybrid electric vehicle (HEV). The vehicle may be propelled via motor torque during lower than threshold engine load conditions and higher than threshold SOC of the electric machine battery. The threshold engine load may be calibrated based on vehicle operating conditions including vehicle speed and the battery SOC. The threshold SOC may correspond to a minimum motor power desired to propel the vehicle. In a further example, an engine non-combusting condition may also include a vehicle key-off condition, when the vehicle is at rest, and is not propelled by engine torque or motor torque.

If it is determined that the engine is combusting fuel in engine cylinders, at 306, current engine operation may be maintained. If a subsequent engine shut-down request is received, during a higher than threshold ambient humidity condition, fueling to each deactivatable cylinder and non-deactivatable cylinder may be disabled and an engine shut-down speed profile may be adjusted to stop the engine in an engine stop position where the deactivatable cylinder valves are closed. Details of an engine shut-down method during a higher than threshold ambient humidity condition is elaborated with reference to FIG. 4.

Returning to 304, if it is determined that the engine is non-combusting, at 308, the routine includes determining if the ambient humidity is higher than a threshold humidity. The controller may calibrate the threshold ambient humidity based on an estimated dew point temperature. The estimated dew point temperature may be based on ambient humidity and the engine intake manifold temperature. The controller may determine the dew point temperature based on a calculation using a look-up table with the input being each of the ambient humidity and the engine intake manifold temperature and the output being the dew point temperature. The controller may determine the engine intake manifold temperature based on input from an intake air temperature sensor (such as IAT sensor 125 In FIG. 2) and an engine coolant temperature sensor coupled to an engine coolant system. In one example, the threshold humidity may correspond to a humidity above which moisture from the air may condense in the engine intake manifold.

During an engine non-combusting condition, the engine intake air temperature may drop lower than the dew point temperature. If at the same time, the ambient humidity is higher than a threshold humidity, humid air may enter the intake manifold via an at least partially open intake throttle and the moisture may condense locally at the engine intake manifold. In one example, due to degradation of the intake passage and/or the throttle, there may be an opening (such as a leak) in a portion of the intake manifold which allows fluidic communication between the intake manifold and the atmosphere. Humid air may enter the engine system through such an opening even when the engine is not combusting and the throttle is commanded to a completely closed position. As a result, a water puddle is formed in the intake manifold. If one or more engine valves are also open at this time (such as due to the engine stopping position during the engine shutdown being a position where the intake valve or the exhaust valve of a cylinder is open), humid air may enter the engine cylinders. The temperature of engine cylinder walls, as estimated based on inputs from the engine coolant temperature sensor may also decrease during the engine non-combusting condition, thereby allowing moisture condensation inside the engine cylinders. Additionally, condensate accumulated in the intake manifold may be ingested into the cylinders through the open valves. Upon subsequent engine operation, such accumulated moisture within the cylinders and in the intake manifold (when ingested) may cause an engine misfire.

If it is determined that the ambient humidity is lower than the threshold humidity, at 310, the engine may be maintained in the non-combusting condition without selective deactivation of cylinder valves. In particular, if one or more valves of the deactivatable cylinders remain open, the valves may be maintained in their respective open positions and may not be actuated to be closed while the engine is not combusting.

If it is determined that the ambient humidity is higher than the threshold humidity, at 312, one or more deactivatable engine cylinders may be selectively deactivated via a VDE mechanism. Since the engine is non-combusting, spark and fuel injection to the engines may be disabled. As such, selective deactivation of the cylinders includes concurrently deactivating the one or more cylinder valves of each deactivatable cylinder of the engine. For example, where the VDE mechanism is a cam-actuated mechanism, the deactivating further includes actuating a solenoid coupled to a camshaft to close the one or more cylinder valves of each deactivatable cylinder. In alternate embodiments, each engine cylinder may be deactivated independently and singularly. Specifically, an eight-cylinder engine may operate in seven-cylinder mode, six-cylinder mode, five-cylinder-mode, or four-cylinder mode, for example. In another example, where the VDE mechanism is an electrically-actuated mechanism, the engine may be fitted with an electric valve actuation (EVA) mechanism (via electric individual cylinder valve actuators) which may be actuated to close the deactivatable cylinder valves at any time during the engine non-combusting condition, regardless of the engine position at shut-down.

For engines fitted with camshaft actuation mechanism (as elaborated in FIG. 2) including individual camshaft-based cylinder valve actuators, selective deactivation of the deactivatable engine cylinders includes, at 313, adjusting a position of the engine in order to engage the one or more camshafts coupled to the deactivatable cylinder valves for deactivation (closing) of each of the deactivatable cylinder valves (intake and exhaust valves). As the camshafts are driven by engine rotation, adjustments to the engine position facilitates actuating the camshafts and closing each of the deactivatable cylinder valves. Adjusting the position of the engine includes, rotating the engine via an electric motor (such as a starter motor or an electric machine of the hybrid vehicle) to bring the engine to a desired stopping position enabling camshaft engagement and deactivatable cylinder valve closure.

In this way, during the higher than threshold humidity condition, the deactivatable cylinder valves may be selectively closed while the one or more valves coupled to the non-deactivatable cylinders may remain open or closed based on the position of their corresponding cam lobes. By closing the deactivatable cylinder valves, the deactivatable cylinder may be sealed, thereby reducing air flow (with high moisture content) into the deactivatable cylinders. As the deactivatable cylinder are sealed, water puddle (caused by condensation of moisture in air) may not form inside these cylinders even when the in-cylinder temperature drops below the dew point temperature.

Once the deactivatable cylinder valves have been closed, at 314, the routine includes determining if a temperature of residual exhaust gas remaining in the engine is higher than a threshold temperature. When cylinder combustion is not carried out, exhaust gas is not freshly generated in the exhaust passage. However, some residual exhaust gas from earlier combustion events may remain in the exhaust passage due to slow clearance. Due to exhaust system having a larger thermal mass relative to the intake system, the residual exhaust gas may retain exhaust heat for a duration even after combustion is suspended. The controller may measure the temperature of the residual exhaust gas via inputs from an exhaust temperature sensor coupled to the exhaust passage and/or infer the temperature based on a last estimated exhaust temperature and a duration of engine non-combustion. In one example, the threshold temperature may be calibrated to correspond to a temperature at which moisture from intake air may not condense in the intake manifold (such as a temperature above the dew point temperature). In another example, the threshold temperature may be calibrated by the controller based on engine intake temperature, ambient humidity, and engine temperature. In yet another example, the threshold temperature may correspond to the boiling point of water such that at higher than the threshold temperature, water condensing in the intake manifold may evaporate.

If it is determined that the temperature of the residual exhaust gas is higher than the threshold temperature, at 318, the controller may actuate the EGR valve (such as EGR valve 144 in FIG. 2) to an open position to recirculate unburnt fuel and hot exhaust gas from the exhaust manifold to the intake manifold via the EGR passage (such as EGR passage 142 in FIG. 2). In one example, since the engine is not combusting, the EGR valve may be fully opened to maximize the residual exhaust gas flow to the intake manifold. During engine non-combusting conditions such as DFSO, the engine intake manifold continues to retain vacuum (low pressure), thereby facilitating exhaust recirculation from the exhaust manifold which is at a higher pressure relative to the intake manifold. As the hot exhaust gas along with the unburnt fuel enters the intake manifold, the intake manifold temperature may increase, thereby reducing the possibility of moisture condensing within the intake manifold.

In another example, recirculating hot exhaust gas from the exhaust manifold to the intake manifold may further include, at 319, adjusting residual exhaust flow based on intake manifold temperature, exhaust temperature, and ambient humidity. As estimate of residual exhaust flow may be obtained based on input from a Differential Pressure Feedback EGR sensor (such as DPFE sensor 146 in FIG. 2) coupled to the EGR passage. The intake manifold temperature may be based on input from one or more of an intake air temperature sensor and an engine coolant temperature sensor. Adjusting the residual exhaust flow includes adjusting an opening of the EGR valve. In one example, the opening of the EGR valve may be increased as the temperature of the residual exhaust gas increases, the ambient humidity increases, or the intake air temperature decreases. In another example, the opening of the EGR valve may be decreased as the temperature of the residual exhaust gas decreases, the ambient humidity decreases, or the intake air temperature increases. The controller may determine the EGR valve opening based on a calculation using a look-up table with the input being each of the intake manifold temperature, the temperature of the residual exhaust gas, and the ambient humidity and the output being the EGR valve opening.

If it is determined that the residual exhaust temperature is lower than the threshold temperature, at 316, the EGR valve may be maintained in a closed position and the residual exhaust gas may not be routed from the exhaust manifold to the intake manifold when the engine is not combusting. Due to the lower than threshold temperature of the residual exhaust gas, heat from the residual exhaust gas may not be effectively used to reduce condensation of moisture in the intake manifold.

At 320, the routine includes determining if engine combusting conditions are met. In one example, engine combusting conditions may be met responsive to an accelerator pedal tip-in. In response to the increased torque demand (such as during the tip-in), the engine may discontinue being operated in an idle-stop or in a DFSO condition. Also, the increased torque demand may not be fulfilled by the HEV electric machine, thereby requiring engine torque to be provided. In another example, during vehicle operation using motor torque, engine combusting conditions may be met responsive to the battery state of charge of the HEV electric machine decreasing below a threshold SOC where the vehicle can no longer be propelled via motor torque. Therefore, responsive to a lower than threshold battery SOC, engine combustion may be started to propel the vehicle with engine torque and to recharge the battery. In yet another example, an engine combusting condition may be confirmed responsive to a request for engine power for operating auxiliary devices such as the air conditioning system. If none of the engine combustion conditions are met, at 322, the engine may be maintained in the non-combusting state and the deactivatable valves may be maintained in a deactivated (closed) condition.

If it is determined that any of the engine combusting conditions are met, at 324, the one or more deactivatable engine cylinders previously deactivated (in step 312) may be reactivated via actuation of the VDE mechanism. Reactivation of the deactivatable cylinders includes opening the previously deactivated intake and exhaust valves of the deactivatable cylinders. In one example, where the VDE mechanism is an electric valve actuation (EVA) mechanism, once the engine combusting conditions are met, the VDE mechanism may be immediately actuated to open the deactivatable cylinder valves, regardless of the engine position at start. In another example, where the VDE mechanism includes camshaft-based cylinder valve actuators, the engine may be cranked via the starter motor and the engine position may be adjusted in order to engage the one or more camshafts coupled to the deactivatable cylinder valves and then each of the deactivatable cylinder valves may be opened.

At 326, combustion may be started in the reactivated cylinders while the non-deactivatable cylinders may be maintained non-combusting. Starting combustion in the reactivated cylinders includes injecting fuel and providing spark to the deactivatable cylinders while maintaining fueling and spark disabled in the non-deactivatable cylinders. The controller may send a signal to one or more fuel injectors coupled to the deactivatable cylinders to resume fueling to these cylinders. Also, the controller may send a signal to the spark plugs coupled to the deactivatable cylinders to resume spark. During the immediately previous engine non-combusting condition, as the ambient humidity increased to above the threshold humidity, by sealing the deactivatable cylinders, accumulation of moisture in the deactivatable cylinders may have been reduced. However, due to the higher than threshold ambient humidity, during the engine non-combusting condition, water may have condensed or been ingested inside the non-deactivatable cylinders which could not be sealed. By first resuming combustion in the non-deactivatable cylinders and by maintaining the non-deactivatable cylinders non-combusting, the possibility of occurrence of misfire (caused due to in-cylinder water accumulation) may be reduced. Combustion in the deactivatable cylinder (non-deactivatable cylinder maintained in non-combusting condition) may be continued for a number of engine cycles immediately after the reactivation of the deactivatable cylinders.

At 328, the routine includes determining if a threshold number of combustion events have elapsed in the deactivatable cylinders. For example, the controller may determine if a number of engine cycles since the initiation of combustion in the non-deactivatable cylinders is higher than a threshold number of engine cycles. In one example, threshold number of engine cycles may be dynamically calibrated based on the intake manifold temperature. The threshold number may decrease as the engine intake manifold temperature increases. Once combustion is started in the deactivatable cylinders, the engine temperature and the intake manifold temperature may increase. An increase in the engine temperature and the intake manifold temperature may result in reduction of the possibility of water condensation in the engine intake manifold and the engine cylinders. Also, the increased engine temperature and the intake manifold temperature may cause previously accumulated moisture to evaporate from the intake manifold.

If it is determined that the number of engine cycles since the initiation of combustion in the deactivatable cylinders is lower than the threshold number of engine cycles, at 330, engine operation may be continued without starting combustion in the non-deactivatable cylinders. Therefore, the deactivatable cylinders may remain combusting and the non-deactivatable cylinders may be maintained in the non-combusting condition. Also, EGR flow may be maintained based on intake manifold temperature, exhaust temperature, and ambient humidity. Due to combustion in the deactivatable cylinders, the exhaust temperature may increase and the recirculation of the unburnt fuel and the hot exhaust gas may further facilitate in increasing the intake manifold temperature.

If it is determined that the number of engine cycles since the initiation of combustion in the deactivatable cylinders is higher than the threshold number of engine cycles, at 332, combustion may be started in the non-deactivatable cylinders while the reactivated (deactivatable) cylinders may be maintained combusting. As an example, after the completion of a higher than threshold number of engine cycles, it may be inferred that the accumulated (condensed) moisture in the intake manifold and inside the non-deactivatable cylinders (not sealed during the engine-off condition) has evaporated and ingestion of moisture may not take place during combustion in the non-deactivatable cylinders, thereby reducing the possibility of occurrence of a misfire. The controller may send a signal to one or more fuel injectors coupled to the non-deactivatable cylinders to resume fueling to these cylinders. Also, the controller may send a signal to the spark plugs coupled to the non-deactivatable cylinders to resume spark. In this way, after the threshold number of engine cycles, fuel may be injected and spark may be provided to the non-deactivatable cylinders while fueling and spark may be maintained in the deactivatable cylinders. Once combustion is resumed in all engine cylinders, based on engine operating conditions such as engine load, the controller may either operate the engine with all cylinders active or may selectively deactivate one or more cylinders to improve fuel economy.

In this way, responsive to an immediately subsequent engine restart condition following an engine non-combusting condition, the VDE actuator may be actuated to selectively reactivate the intake valve and the exhaust valve of the deactivatable cylinder, and fueling to the deactivatable cylinder may be resumed while maintaining fueling deactivated for the non-deactivatable cylinder. After operating the deactivatable cylinder fueled and the non-deactivatable cylinder unfueled for a threshold number of engine cylices immediately after initiation of fueling to the deactivatable cylinder, fueling to each engine cylinder including the non-deactivatable cylinder may be resumed.

Also, as combustion is resumed in all engine cylinders, the intake manifold temperature and the engine temperature may continue to increase and recirculation of hot exhaust may no longer be desired to further increase the intake manifold temperature. Therefore, at 334, the opening of the EGR valve may be adjusted based on EGR demand (engine dilution demand) and independent of intake manifold temperature and ambient humidity. The controller may determine the EGR demand as a function of engine operating conditions including engine load, engine speed, and engine temperature. In one example, the controller may determine the desired EGR flow based on a calculation using a look-up table with the input being each of the engine load, the engine speed, and the engine temperature and the output being the EGR flow.

In this way, in response to a higher than threshold ambient humidity, during an engine-off condition, each intake valve and exhaust valve coupled to one or more deactivatable engine cylinders may be selectively closed, and an opening of an exhaust gas recirculation (EGR) valve coupled to an EGR passage may be adjusted based on temperature of residual exhaust gas. In addition, for an engine (such as a diesel engine) equipped with glow plugs, during engine non-combusting conditions, responsive to higher than threshold humidity conditions, the glow plugs may be activated to heat the engine intake manifold. By heating the engine intake manifold, evaporation of the accumulated condensate may be expedited and further condensate formation may be reduced.

Figure 4:
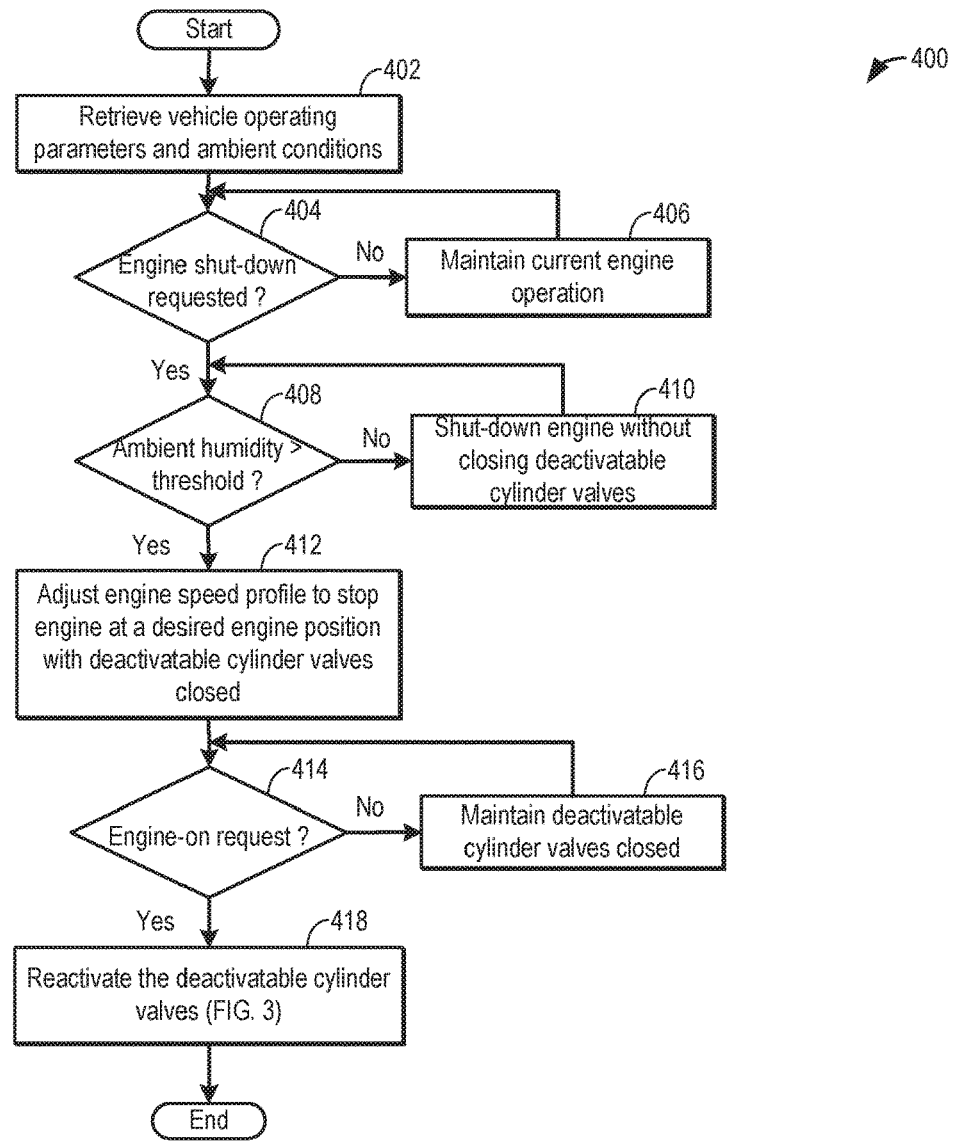
FIG. 4 shows a flow chart illustrating an example method that can be implemented to shut-down an engine during high humidity conditions.
Figure 5:
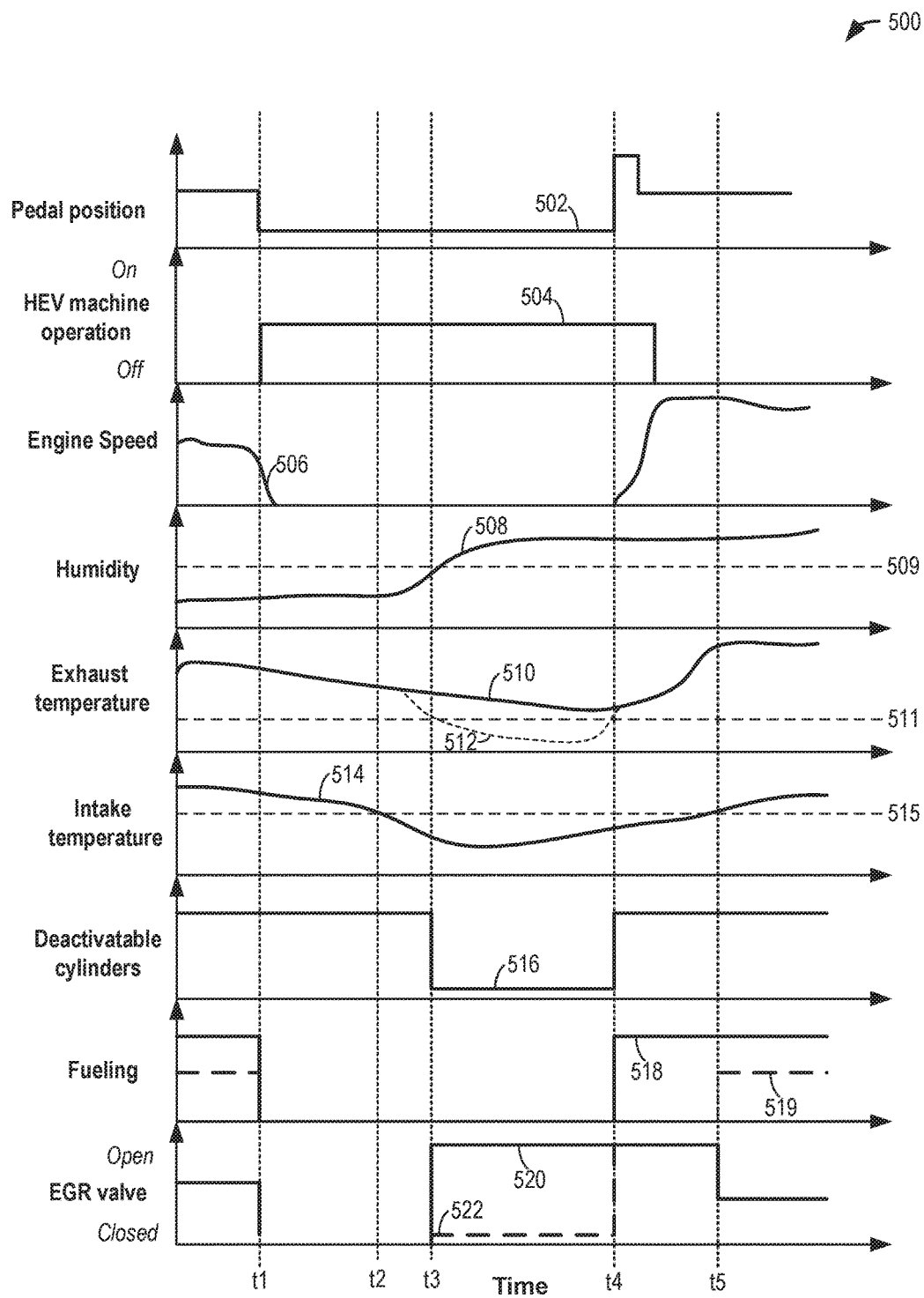
FIG. 5 shows an example reduction of water accumulation in the engine intake, according to the present disclosure.

FIG. 4 shows an example method 400 for shutting-down an engine during high humidity conditions so as to reduce cylinder condensate ingestion. Method 400 may be a part of method 300 and may be carried out, for example, in step 306 of the method 300.

At 302, current vehicle and engine operating conditions, as estimated in step 302 of FIG. 3, may be retrieved. These may include, for example, operator torque demand, engine speed, vehicle speed, engine temperature, engine load, exhaust temperature, manifold pressure, manifold air flow, battery state of charge, etc. In addition ambient conditions such as ambient humidity, temperature, and barometric pressure may be estimated.

At 404, the routine includes determining if an engine shut-down is requested. In one example, engine shut-down may be requested when one or more conditions for an idle-stop (as discussed in step 304 of FIG. 3) are met. In another example, fueling and spark may be disabled in response to an accelerator pedal tip-out condition (causing a reduction in torque demand) resulting in a deceleration fuel shut-off (DFSO) condition. In yet another example, engine shut-down may be requested responsive to a lower than threshold torque demand when the vehicle may be propelled using motor torque (from the HEV electric machine) and engine torque is no longer desired. In a further example, an engine shut-down request may be in response to a vehicle key-off when the vehicle is stationary and is no longer propelled using engine torque or motor torque.

If it is determined that an engine shut-down has not been requested, at 406, current engine operations may be maintained. If it is determined that a engine shut-down is requested, at 408, the routine includes determining if the ambient humidity is higher than a threshold humidity. The threshold humidity may be based on a dew point temperature. In one example, the threshold humidity may correspond to a humidity above which moisture from the air may condense in the engine intake manifold and/or inside the engine cylinders. In one example, the controller may retrieve weather conditions for a projected drive cycle (travel path) of the vehicle from an external server communicatively coupled to the vehicle. The projected drive cycle may be determined based on input to an on-board global positioning satellite (GPS) device. The routine may also include determining if during any upcoming portion of the drive cycle, the ambient humidity may increase to above the threshold humidity.

If it is determined that the ambient humidity is lower than the threshold and will continue to be lower than the threshold throughout the drive cycle, at 410, the engine may be shut-down without deactivation (closing) of the deactivatable cylinder valves. If it is determined that the ambient humidity is higher than the threshold or may increase to above the threshold during the drive cycle, the deactivatable exhaust valves may be preemptively closed to reduce air with high moisture content from entering the deactivatable cylinders. As the deactivatable cylinders are sealed, water puddle may not form inside these cylinders even when the in-cylinder temperature reduces to below the dew point temperature. At 412, an engine shutdown speed profile may be adjusted to stop the engine in a desired engine stop position where the deactivatable cylinder valves are closed, such as by stopping a deactivatable cylinder piston in a power stroke. As an example, the engine speed profile may be adjusted by providing motor torque via one or more of a starter motor and the HEV electric machine. In one example, if the engine speed is higher than an engine speed at which the desired engine stop position may be reached, negative torque may be applied to the engine to lower the engine speed such that upon engine stop, the engine reaches the desired engine stop position.

The controller may first disable fueling and spark to the deactivatable cylinders and then rotate the engine using motor torque (from the starter motor or the HEV electric machine) in order to bring the engine to the desired engine stop position. At the desired engine stop position, the one or more camshafts coupled to the deactivatable cylinder valves may be actuated to close the deactivatable cylinder valves.

At 414, the routine includes determining if an engine-on request has been made. In one example, an engine-on request may be made in response to an accelerator pedal tip-in. In response to the increased torque demand (such as during the tip-in), the engine may no longer be idle stopped or operated in a DFSO condition. Also, the increased torque demand may not be fulfilled by the HEV electric machine, thereby requesting engine torque. In another example, during vehicle operation using motor torque, the battery state of charge of the HEV electric machine may decrease below the threshold SOC and the vehicle may no longer be propelled via motor torque. Therefore, during lower than threshold battery SOC, engine operation (combustion) may be started to propel the vehicle with engine torque and to recharge the electric machine. In yet another example, an engine-on request may be in response to a request for engine power for operating auxiliary devices such as the air conditioning system. In a further example, an engine-on request may be in response to a vehicle key-on request when the vehicle is desired to be operated (propelled) using engine torque after a period of vehicle inactivity. If it is determined that an engine-on request has not been made, at 416, the engine may be maintained in the non-combusting condition and the deactivatable valves may be maintained in a deactivated (closed) condition.

If it is determined that engine-on (combustion) has been requested, at 418, the one or more deactivatable engine cylinders previously deactivated (in step 412) may be reactivated via the VDE mechanism. Reactivation of the deactivatable cylinders include opening the previously deactivated intake and exhaust valves of the deactivatable cylinders. The routine may then proceed to step 326 of method 300, as discussed with reference to FIG. 3.

In this way, during the higher than threshold ambient humidity, responsive to an engine shut-down request, fueling to each of the deactivatable cylinders and the non-deactivatable cylinders may be disabled, and an engine shutdown speed profile may be adjusted to stop the engine in an engine stop position where the deactivatable cylinder valves are closed.

FIG. 5 shows an example operating sequence 500 illustrating reduction of water accumulation in the engine intake manifold and engine cylinders during engine non-combusting conditions. The horizontal (x-axis) denotes time and the vertical markers t1-t5 identify significant times in the routine for reduction of water accumulation and a consequent occurrence of misfire.

The first plot, line 502, shows a position of an accelerator pedal. The second plot, line 504, shows operation of an electric machine coupled to the hybrid electric vehicle (HEV). The third plot, line 506, shows engine speed as estimated based on input from a crankshaft acceleration sensor. The fourth plot, line 508, shows ambient humidity as estimated based on input from an ambient humidity sensor coupled to the engine intake manifold. Dashed line 509 shows a threshold humidity above which water from air may condense on engine components including the intake manifold and engine cylinders. The fifth plot, line 510, shows exhaust temperature as estimated based on input from an exhaust temperature sensor coupled to the exhaust passage. Dashed line 511 shows a threshold exhaust temperature above which hot exhaust gas may be used to evaporate accumulated condensate and reduce further condensation of moisture on engine components. The sixth plot, line 514, shows an engine intake manifold temperature as estimated based on inputs from one or more of the intake air temperature sensor and an engine coolant temperature sensor. Dashed line 515 shows a threshold intake manifold temperature below which water from air may condense on engine components including the intake manifold and engine cylinders. The seventh plot, line 516, shows operation of the deactivatable engine cylinders. The eighth plot, line 518, shows fueling to deactivatable engine cylinders. Dashed line 519 shows fueling to non-deactivatable cylinders. The ninth plot, line 520, shows position of an exhaust gas recirculation (EGR) valve coupled to an EGR passage supplying exhaust gas from the exhaust to the intake manifold.

Prior to time t1, during a tip-in condition, engine torque is used to propel the vehicle while the HEV electric motor is not operated. All engine cylinders including the deactivatable engine cylinders are active (such as each cylinder valve coupled to the deactivatable cylinders are active) and fuel is delivered to each of the deactivatable cylinders and the non-deactivatable cylinders. The EGR valve is opened to supply a desired amount of EGR to the intake manifold based on engine dilution demands. Due to combustion in engine cylinders, the intake manifold temperature and the exhaust manifold temperature remains above the respective thresholds 515 and 511. Also, the ambient humidity is below the threshold humidity 509, thereby reducing the concern of condensation of moisture on the engine components.

At time t1, in response to a tip-out condition, a decrease in torque demand is inferred. Due to the decreased torque demand, the engine is shut-down and the electric machine is activated to provide motor torque for vehicle propulsion. Between time t1 and t2, the motor torque provided by the electric machine may be sufficient to propel the vehicle with the decreased torque demand and engine torque is no longer desired. As the engine is shut-down, fueling to each of the deactivatable cylinders and the non-deactivatable cylinders is disabled and the EGR valve is actuated to a completely closed position. Due to the suspension of combustion, heat is no longer generated at the engine and consequently, between time t1 and t2, intake manifold temperature decreases progressively.

At time t2, the intake manifold temperature reduces to below the threshold 515. As an example, the threshold 515 may be calibrated prior to time t2 based on one or more of engine temperature and dew point temperature. As the exhaust manifold has a larger thermal mass relative to the intake manifold, even as the intake temperature reduces to below the threshold 515, the exhaust manifold temperature continues to remain above the threshold 511. Since combustion is not carried out, exhaust gas may no longer be supplied. However, some residual exhaust gas from previous combustion events may remain in the exhaust passage and during the engine non-combusting condition, exhaust temperature refers to the temperature of the residual exhaust gas present in the exhaust manifold. As an example, the threshold 515 may be calibrated prior to time t2 based on one or more of intake temperature, ambient humidity, dew point temperature, and engine temperature. Between time t2 and t3, the ambient humidity remains below the threshold 509, thereby reducing the possibility of moisture condensation on the engine components. As an example, the threshold 509 may be calibrated prior to time t2 based on the dew point temperature. Between t2 and t3, the vehicle is propelled via motor torque from the HEV electric machine.

At time t3, the vehicle enters an area with a higher than threshold 509 ambient humidity. In response to the ambient humidity increasing to above the threshold 509 and due to the lower than threshold 515 intake temperature, it is inferred that moist air may enter the intake manifold and condense inside the intake manifold and the engine cylinders and the routine to reduce condensate accumulation is thereby initiated. At time t3, the deactivatable cylinders are selectively deactivated via a valve actuation mechanism coupled to the deactivatable cylinders. Selective deactivation of the deactivatable engine cylinders include, adjusting a position of the engine in order to engage the one or more camshafts coupled to the deactivatable cylinder valves for deactivation (closing) of the deactivatable cylinder valves (intake and exhaust valves). The engine is rotated via motor torque supplied by the HEV electric machine until the camshafts are engaged and each valve coupled to the deactivatable cylinders are closed. By closing the deactivatable cylinder valves, there may be a reduction in moisture from the high humidity ambient air entering the deactivatable cylinders, thereby protecting the cylinders from condensate accumulation.

Between time t3 and t4, since the exhaust temperature (temperature of residual exhaust gas) is higher than the threshold 511, it is inferred that the hot exhaust gas may be used to evaporate any condensate forming in the intake manifold and also to reduce further condensation of moisture in the intake manifold. Therefore, at time t3, the controller actuates the EGR valve to a fully open position to recirculate hot exhaust gas and residuals from the exhaust manifold to the intake manifold. As the hot exhaust gas is introduced to the intake manifold, between time t3 and t4, the temperature of the intake manifold steadily increases. In this way, by sealing the deactivatable cylinders and routing hot exhaust to the intake manifold, possibility of condensate accumulation in the intake manifold and inside at least the deactivatable cylinders is decreased.

In one example, between time t3 and t4, if the exhaust temperature was below the threshold 511 (as shown by dotted line 512), exhaust gas may not be recirculated as the cold exhaust gas would not be beneficial in evaporating accumulated condensate from the intake manifold and for reducing further condensation of moisture laden air. Therefore, under circumstances when the exhaust temperature is below threshold 511, as shown by dashed line 522, the EGR valve is maintained in a closed position to reduce exhaust gas recirculation.

At time t4, in response to an accelerator tip-in, it is inferred that there is an increased torque demand and engine torque is needed to meet the desired torque. Therefore, at time t4, the controller selectively activates the deactivatable cylinder valves in order to initiate combustion in the deactivatable cylinders. Fueling and spark are resumed for the deactivatable cylinders while fueling and spark are maintained deactivated for the non-deactivatable cylinders, thereby maintaining the non-deactivatable cylinders in a non-combusting condition. Since the deactivatable cylinders were sealed between time t3 and t4, during the higher than threshold 509 ambient humidity and lower than threshold 515 intake temperature condition, accumulation of moisture in the deactivatable cylinders has been reduced. However, since between time t3 and t4, the non-deactivatable cylinder valves were not closed, water may have condensed inside the non-deactivatable cylinders. By first resuming combustion in the non-deactivatable cylinder and by maintaining the non-deactivatable cylinders non-combusting, the propensity of water ingestion by the engine cylinders causing misfire may be reduced. As combustion is resumed, each of the engine intake temperature and the exhaust temperature progressively increase. The engine is operated with combustion being carried out in the deactivatable cylinders and the non-deactivatable cylinders being maintained in the non-combusting condition until the intake temperature increases to above the threshold 515. Between time t4 and t5, the EGR valve is continued to be maintained in a fully open position to route hot exhaust to the intake manifold for expedited heating of the intake manifold. Once engine combustion is resumed (in the deactivatable cylinders), motor torque is no longer desired for propelling the vehicle and the electric machine is deactivated.

At time t5, the intake temperature increases to above the threshold 515, thereby reducing the possibility of further condensate formation in the intake manifold. Also, the higher than threshold 515 intake temperature may cause the remaining condensate to evaporate from the intake manifold. Due to the decreased possibility of condensate formation in the intake manifold, at time t5, fueling and spark to the non-deactivatable cylinders is resumed and after time t5, combustion is carried out in each of the deactivatable and the non-deactivatable cylinders. Also, since further heating of the intake manifold is not desired, after time t5, the EGR valve position is adjusted based on EGR demand and independent of exhaust and intake temperatures.

In this way, by selectively sealing deactivatable engine cylinders during an engine-off condition when the ambient humidity reduces to below a threshold, possibility of water condensation within the deactivatable engine cylinders is reduced. By first resuming combustion in the previously sealed deactivatable engine cylinders upon an immediately subsequent engine combustion event following the engine-off condition, the engine may be operated with reduced possibility of water ingestion and a reduced propensity of misfire. The technical effect of recirculating hot exhaust gas to the intake manifold during the engine-off condition is that residual exhaust heat may be effectively used to increase the engine intake temperature and evaporate the moisture entering the intake manifold, thereby reducing the possibility of moisture condensation on engine components. Overall, by reducing water condensation on engine components including the intake manifold and engine cylinders, combustion stability may be increased and possibility of occurrence of a misfire may be reduced during an immediately subsequent engine combusting condition following an engine-off condition.

An example engine method comprises: responsive to a higher than threshold ambient humidity, during an engine non-combusting condition, holding deactivatable cylinder valves closed, and during an immediately subsequent engine combusting condition, activating the deactivatable cylinder valves, and starting combustion in deactivatable cylinders before starting combustion in non-deactivatable cylinders. In any preceding example, additionally or optionally, holding the deactivatable cylinder valves closed includes rotating the engine via an electric motor to engage one or more camshafts coupled to the deactivatable cylinder valves for deactivation of the deactivatable cylinder valves while non-deactivatable cylinder valves are maintained in an active state. In any or all of the preceding examples, additionally or optionally, starting combustion in the deactivatable cylinders includes, for a threshold number of engine cycles immediately following the activation of the deactivatable cylinder valves, injecting fuel and providing spark to the deactivatable cylinders while maintaining fueling and spark disabled in the non-deactivatable cylinders. In any or all of the preceding examples, additionally or optionally, starting combustion in the non-deactivatable cylinders includes, after the threshold number of engine cycles, injecting fuel and providing spark to the non-deactivatable cylinders while maintaining fueling and spark enabled in the deactivatable cylinders, wherein the threshold number of engine cycles is based on an intake manifold temperature, the threshold number decreased as the engine intake temperature increases. In any or all of the preceding examples, the method further comprises, additionally or optionally, during the engine non-combusting condition, responsive to a higher than threshold temperature of residual exhaust gas in the engine, adjusting an exhaust gas recirculation (EGR) valve coupled to an EGR passage to recirculate the residual exhaust gas from an engine exhaust manifold to an intake manifold via the EGR passage. In any or all of the preceding examples, additionally or optionally, adjusting the EGR valve includes increasing the opening of the EGR valve as the temperature of the residual exhaust gas increases, the ambient humidity increases, or the intake manifold temperature decreases. In any or all of the preceding examples, additionally or optionally, the engine is coupled in a vehicle and wherein the ambient humidity is measured via one or more of an intake humidity sensor, a windshield humidity sensor, and weather data including ambient humidity conditions retrieved from an external network communicatively coupled to the vehicle via wireless communication. In any or all of the preceding examples, additionally or optionally, the vehicle is a hybrid vehicle further comprising an electric machine coupled to a battery, and wherein the immediately subsequent engine combusting condition is in response to a lower than threshold state of charge of the battery or a higher than threshold operator torque demand. In any or all of the preceding examples, the method further comprises, additionally or optionally, during the higher than threshold ambient humidity, responsive to an engine shut-down request, disabling fueling to each of the deactivatable cylinders and the non-deactivatable cylinders, and adjusting an engine shutdown speed profile to stop the engine in an engine stop position where the deactivatable cylinder valves are closed. In any or all of the preceding examples, additionally or optionally, the adjusting the engine speed profile includes rotating the engine via one of a starter motor or the electric machine of the hybrid vehicle. In any or all of the preceding examples, additionally or optionally, the threshold ambient humidity is calibrated based on an estimated dew point temperature.

Another engine example method comprises: in response to a higher than threshold ambient humidity, during an engine-off condition, selectively closing each intake valve and exhaust valve coupled to one or more deactivatable engine cylinders, and adjusting an opening of an exhaust gas recirculation (EGR) valve coupled to an EGR passage based on temperature of residual exhaust gas. In any preceding example, additionally or optionally, adjusting the opening of the EGR valve includes, in response to a higher than threshold temperature of the residual exhaust gas, increasing the opening as an intake manifold temperature decreases and the ambient humidity increases and decreasing the opening as the intake manifold temperature increases and the ambient humidity decreases, and in response to a lower than threshold temperature of the residual exhaust gas, closing the EGR valve. In any or all of the preceding examples, the method further comprises, additionally or optionally, during an immediately subsequent engine restart, activating the each intake valve and exhaust valve coupled to the one or more deactivatable engine cylinders, and resuming fueling to the one or more deactivatable cylinders while maintaining non-deactivatable cylinders of the engine unfueled. In any or all of the preceding examples, the method further comprises, additionally or optionally, in response to the intake manifold temperature increasing to above a threshold temperature, resuming fueling to the one or more non-deactivatable cylinders while maintaining the non-deactivatable cylinders fueled, and adjusting the opening of the EGR valve based on engine dilution demand. In any or all of the preceding examples, additionally or optionally, the engine-off condition includes one of an idle-stop condition, a deceleration fuel shut-off condition, and an engine shut-down event.

In yet another example, a hybrid vehicle system comprises: an electric machine including a battery, an engine with a deactivatable cylinder and a non-deactivatable cylinder, each of an intake valve and an exhaust valve coupled to the deactivatable cylinder, each of the intake valve and exhaust valve selectively actuatable via a variable displacement engine (VDE) actuator, each of another intake valve and another exhaust valve coupled to the non-deactivatable cylinder, one or more fuel injectors coupled to each of the deactivatable cylinder and the non-deactivatable cylinder, an ambient humidity sensor and an intake air temperature sensor coupled to an engine intake manifold, an exhaust temperature sensor coupled to an exhaust manifold, a rain sensor coupled to a vehicle windshield wiper, an exhaust gas recirculation (EGR) passage coupling the engine exhaust manifold to the engine intake manifold, the EGR passage including an EGR valve, and a controller with computer readable instructions stored on non-transitory memory for: estimating ambient humidity via one or more of the ambient humidity sensor and the rain sensor, responsive to a first engine-off condition, actuating the VDE actuator to selectively close the intake valve and the exhaust valve of the deactivatable cylinder while maintaining the another intake valve and another exhaust valve of the non-deactivatable cylinder open before disabling fuel to the engine, and responsive to a second engine-off condition, maintaining each of the intake valve and the exhaust valve of the deactivatable cylinder and the another intake valve and another exhaust valve of the non-deactivatable cylinder open before disabling fuel to the engine. In any preceding example, additionally or optionally, an ambient humidity during the first engine-off condition is higher than during the second engine-off condition. In any preceding example, additionally or optionally, the controller contains further instructions for: responsive to an immediately subsequent engine restart condition, actuating the VDE actuator to selectively reactivate the intake valve and the exhaust valve of the deactivatable cylinder, and initiating fueling to the deactivatable cylinder while maintaining fueling deactivated for the non-deactivatable cylinder, and after operating the deactivatable cylinder fueled and the non-deactivatable cylinder unfueled for a threshold number of engine cylices immediately after initiation of fueling to the deactivatable cylinder, resuming fueling to each engine cylinder including the non-deactivatable cylinder. In any preceding example, additionally or optionally, the controller contains further instructions for: estimating temperature of residual exhaust gas via the exhaust temperature sensor, responsive to a higher than threshold exhaust temperature while the vehicle is propelled via the electric machine, actuating the EGR valve to an open position to route residual exhaust gas from the exhaust manifold to the intake manifold via the EGR passage, and responsive to a lower than threshold exhaust temperature while the vehicle is propelled via the electric machine, maintaining the EGR valve closed. In any preceding example, additionally or optionally, the controller contains further instructions for: while the vehicle is propelled via the electric machine, adjusting an opening of the EGR valve based on each of the exhaust temperature, the ambient humidity, and an engine intake manifold temperature as estimated via the intake air temperature sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine of a hybrid vehicle, comprising:
   with a controller, estimating ambient humidity via a humidity sensor;
   with the controller, responsive to a higher than threshold ambient humidity, during an engine non-combusting condition, actuating a variable displacement engine (VDE) actuator to close deactivatable cylinder valves, and maintaining non-deactivatable cylinder valves in an active state, and during an immediately subsequent engine combusting condition, activating the deactivatable cylinder valves, and starting combustion in deactivatable cylinders before starting combustion in non-deactivatable cylinders; and with the controller, responsive to a lower than threshold ambient humidity, during the engine non-combusting condition, maintaining each of the deactivatable cylinder valves and the non-deactivatable cylinder valves in an active state.

2. The method of claim 1, wherein closing the deactivatable cylinder valves includes rotating the engine via an electric motor to engage one or more camshafts coupled to the deactivatable cylinder valves for deactivation of the deactivatable cylinder valves.

3. The method of claim 2, wherein the engine is coupled in a vehicle and wherein the humidity sensor includes one or more of an intake humidity sensor and a windshield humidity sensor, the method further comprising, estimating ambient humidity based on weather data including ambient humidity conditions retrieved from an external network communicatively coupled to the vehicle via wireless communication.

4. The method of claim 3, wherein the vehicle is a hybrid vehicle further comprising an electric machine coupled to a battery, and wherein the immediately subsequent engine combusting condition is in response to a lower than threshold state of charge of the battery or a higher than threshold operator torque demand.

5. The method of claim 4, further comparing:
during the higher than threshold ambient humidity,
responsive to an engine shut-down request,
disabling fueling to each of the deactivatable cylinders and the non-deactivatable cylinders; and
adjusting an engine shutdown speed profile to stop the engine in an engine stop position where the deactivatable cylinder valves are closed.

6. The method of claim 5, wherein the adjusting the engine shutdown speed profile includes rotating the engine via one of a starter motor or the electric machine of the hybrid vehicle.

7. The method of claim 1, wherein starting combustion in the deactivatable cylinders includes, for a threshold number of engine cycles immediately following the activation of the deactivatable cylinder valves, injecting fuel and providing spark to the deactivatable cylinders while maintaining fueling and spark disabled in the non-deactivatable cylinders.

8. The method of claim 7, wherein starting combustion in the non-deactivatable cylinders includes, after the threshold number of engine cycles, injecting fuel and providing spark to the non-deactivatable cylinders while maintaining fueling and spark enabled in the deactivatable cylinders, wherein the threshold number of engine cycles is based on an intake manifold temperature, the threshold number decreased as the temperature increases.

9. The method of claim 8, further comprising, during the engine non-combusting condition, responsive to a higher than threshold temperature of residual exhaust gas in the engine, adjusting an exhaust gas recirculation (EGR) valve coupled to an EGR passage to recirculate the residual exhaust gas from an engine exhaust manifold to an intake manifold via the EGR passage.

10. The method of claim 9, wherein adjusting the EGR valve includes increasing an opening of the EGR valve as the temperature of the residual exhaust gas increases, the ambient humidity increases, or the intake manifold temperature decreases.

11. The method of claim 1, wherein the threshold ambient humidity is calibrated based on an estimated dew point temperature.

12. A method for controlling an engine of a hybrid vehicle, comprising:
with a controller, estimating ambient humidity via a humidity sensor;
with the controller, in response to a higher than threshold ambient humidity, during an engine-off condition, actuating a variable displacement engine (VDE) actuator to selectively close each intake valve and exhaust valve coupled to one or more deactivatable engine cylinders, maintaining each intake valve and exhaust valve coupled to one or more non-deactivatable engine cylinders open, and adjusting an opening of an exhaust gas recirculation (EGR) valve coupled to an EGR passage based on a temperature of residual exhaust gas; and
with the controller, in response to a lower than threshold ambient humidity, during the engine-off condition, maintaining the each intake valve and exhaust valve coupled to the one or more deactivatable engine cylinders and the each intake valve and exhaust valve coupled to the one or more non-deactivatable engine cylinders open.

13. The method of claim 12, wherein adjusting the opening of the EGR valve includes, in response to a higher than threshold temperature of the residual exhaust gas, increasing the opening as an intake manifold temperature decreases and the ambient humidity increases and decreasing the opening as the intake manifold temperature increases and the ambient humidity decreases, and, in response to a lower than threshold temperature of the residual exhaust gas, closing the EGR valve.

14. The method of claim 13, further comprising, during an immediately subsequent engine restart, activating the each intake valve and exhaust valve coupled to the one or more deactivatable engine cylinders, and resuming fueling to the one or more deactivatable cylinders while maintaining non-deactivatable cylinders of the engine unfueled.

15. The method of claim 14, further comprising, in response to the intake manifold temperature increasing to above a threshold temperature, resuming fueling to the one or more non-deactivatable cylinders while maintaining the non-deactivatable cylinders fueled, and adjusting the opening of the EGR valve based on engine dilution demand.

16. The method of claim 12, wherein the engine-off condition includes one of an idle-stop condition, a deceleration fuel shut-off condition, and an engine shut-down event.

17. A hybrid vehicle system, comprising:
an electric machine including a battery;
an engine with a deactivatable cylinder and a non-deactivatable cylinder;
each of an intake valve and an exhaust valve coupled to the deactivatable cylinder, each of the intake valve and exhaust valve selectively actuatable via a variable displacement engine (VDE) actuator;
each of another intake valve and another exhaust valve coupled to the non-deactivatable cylinder;
one or more fuel injectors coupled to each of the deactivatable cylinder and the non-deactivatable cylinder;
an ambient humidity sensor and an intake air temperature sensor coupled to an engine intake manifold;
an exhaust temperature sensor coupled to an engine exhaust manifold;
a rain sensor coupled to a vehicle windshield wiper;
an exhaust gas recirculation (EGR) passage coupling the engine exhaust manifold to the engine intake manifold, the EGR passage including an EGR valve; and a controller with computer readable instructions stored on non-transitory memory for:
  estimating ambient humidity via one or more of the ambient humidity sensor and the rain sensor;
  responsive to a first engine-off condition, actuating the VDE actuator to selectively close the intake valve and the exhaust valve of the deactivatable cylinder while maintaining the another intake valve and the another exhaust valve of the non-deactivatable cylinder open before disabling fuel to the engine; and
  responsive to a second engine-off condition, maintaining each of the intake valve and the exhaust valve of the deactivatable cylinder and the another intake valve and the another exhaust valve of the non-deactivatable cylinder open before disabling fuel to the engine.

18. The system of claim 17, wherein an ambient humidity during the first engine-off condition is higher than an ambient humidity during the second engine-off condition.

19. The system of claim 17, wherein the controller contains further instructions for: responsive to an immediately subsequent engine restart condition, actuating the VDE actuator to selectively reactivate the intake valve and the exhaust valve of the deactivatable cylinder, and initiating fueling to the deactivatable cylinder while maintaining fueling deactivated for the non-deactivatable cylinder, and, after operating the deactivatable cylinder fueled and the non-deactivatable cylinder unfueled for a threshold number of engine cylices immediately after initiation of fueling to the deactivatable cylinder, resuming fueling to each engine cylinder including the non-deactivatable cylinder.

20. The system of claim 17, wherein the controller contains further instructions for:
  estimating a temperature of residual exhaust gas via the exhaust temperature sensor;
  responsive to a higher than threshold exhaust temperature while the vehicle is propelled via the electric machine, actuating the EGR valve to an open position to route the residual exhaust gas from the engine exhaust manifold to the engine intake manifold via the EGR passage; and
  responsive to a lower than threshold exhaust temperature while the vehicle is propelled via the electric machine, maintaining the EGR valve closed.

* * * * *